(12) United States Patent
Nanahara et al.

(10) Patent No.: US 6,207,212 B1
(45) Date of Patent: Mar. 27, 2001

(54) METHOD AND APPARATUS FOR CONVEYING BAR-LIKE BREAD DOUGH PIECES

(75) Inventors: Kazuhide Nanahara; Yasuhiko Ikeda, both of Utsunomiya (JP)

(73) Assignee: Rheon Automatic Machinery Co., Ltd., Utsunomiya (JP)

( * ) Notice: Subject to any disclaimer, the term of this patent is extended or adjusted under 35 U.S.C. 154(b) by 0 days.

(21) Appl. No.: 09/323,572

(22) Filed: Jun. 1, 1999

(30) Foreign Application Priority Data

Jun. 5, 1998 (JP) .................................. 10-157493

(51) Int. Cl.$^7$ .............................. A21C 11/00; A21D 6/00
(52) U.S. Cl. ......................... 426/496; 425/320; 425/335; 425/364 R; 426/500; 426/512
(58) Field of Search ..................... 426/231, 500, 426/501, 496, 512, 517; 425/320, 335, 364 R, 371

(56) References Cited

U.S. PATENT DOCUMENTS

| | | | |
|---|---|---|---|
| 2,450,033 | 9/1948 | Cohen | 107/4 |
| 5,460,081 | * 10/1995 | Ueno et al. | 425/321 |
| 5,505,970 | * 4/1996 | Morikawa | 426/231 |
| 5,516,538 | * 5/1996 | Ueno et al. | 426/231 |
| 5,538,414 | * 7/1996 | Kobayashi et al. | 426/501 |

FOREIGN PATENT DOCUMENTS

| | | |
|---|---|---|
| 35 38 903 C1 | 1/1987 | (DE) . |
| 44 02 346 A1 | 8/1995 | (DE) . |
| 197 47 472 A1 | 4/1999 | (DE) . |
| 0 647 403 A1 | 4/1995 | (EP) . |
| 0 670 115 A1 | 9/1995 | (EP) . |
| 0 770 330 A1 | 5/1997 | (EP) . |
| 2 500 266 | 8/1982 | (FR) . |
| 2 650 481 | 2/1991 | (FR) . |
| 2 722 654 | 1/1996 | (FR) . |
| 684627 | 12/1952 | (GB) . |
| 1 561 391 | 2/1980 | (GB) . |
| 58-51834 | 3/1983 | (JP) . |

* cited by examiner

Primary Examiner—George C. Yeung
(74) Attorney, Agent, or Firm—Limbach & Limbach L.L.P.

(57) ABSTRACT

A method of conveying bar-like bread dough pieces is provided. By it a bar-like bread dough piece being conveyed on the conveying face of a conveyor, with its axis being perpendicular to the direction of the conveyance thereof, is caused to rotate about the axis at a point downstream of the conveyor, and then the bar-like bread dough piece having a straight shape is moved to the next step. Further, an apparatus for conveying bar-shaped bread dough pieces is provided. It comprises a conveyor, and an engaging member provided near the conveying face of said conveyor, at a point downstream of said conveyor, for allowing a bar-like bread dough piece being conveyed on the conveying face of the conveyor to rotate about its axis while the engaging member contacts the bar-like bread dough piece, the distance between the engaging member and the conveying face being adjustable.

17 Claims, 11 Drawing Sheets

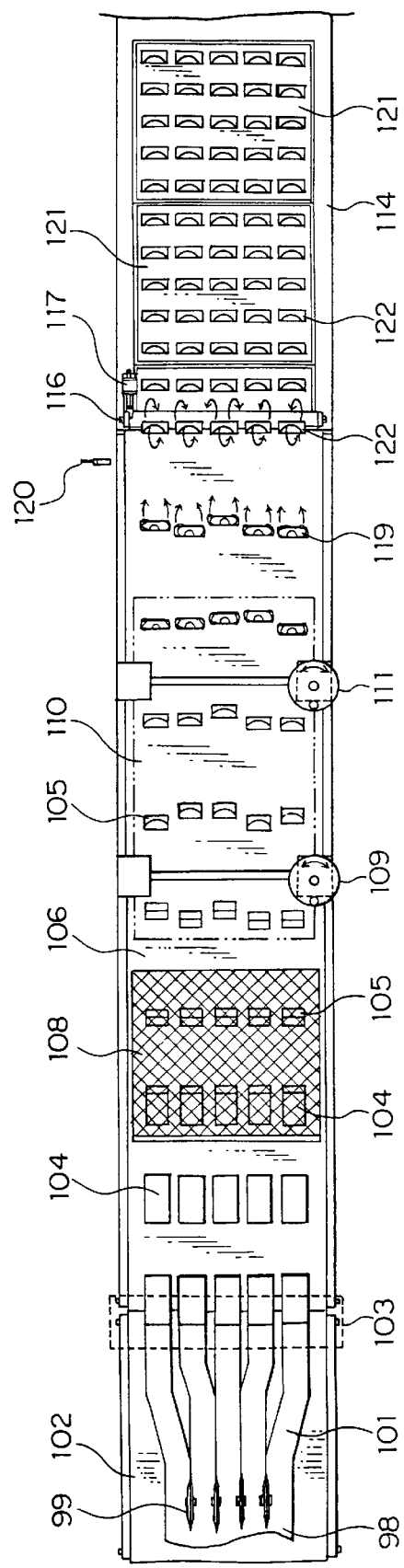

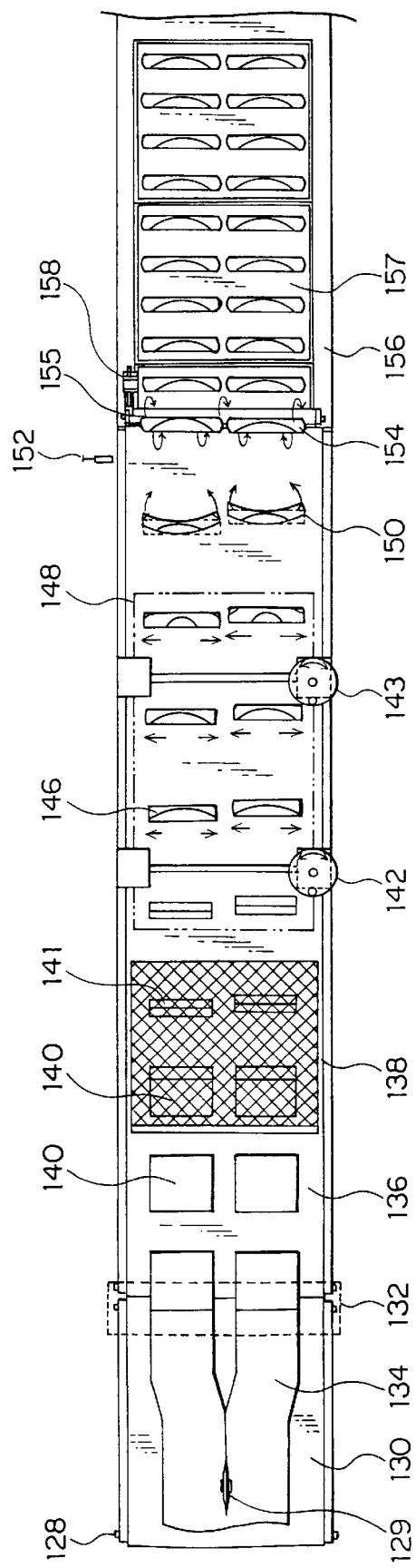

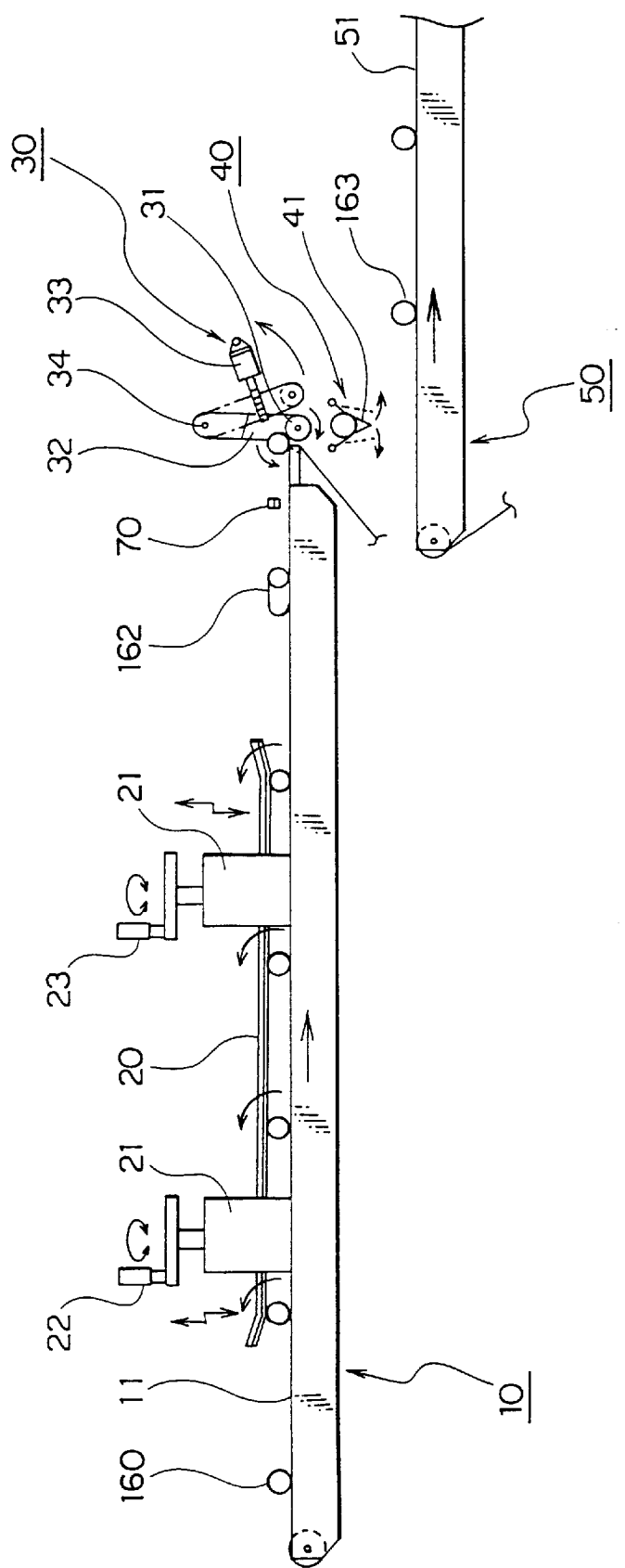

METHOD AND APPARATUS FOR CONVEYING BAR-LIKE BREAD DOUGH PIECES

BACKGROUND OF THE INVENTION

1. Field of the Invention

This invention relates to a method and apparatus for conveying bar-like bread dough pieces. It especially relates to a method and apparatus in and by which bar-like bread dough pieces having a bent shape are modified to have a straight shape for producing bread for French bread such as baguettes.

2. Prior Art

In shaping bar-shaped bread dough pieces, say, for French bread, a dough mass is divided and cut into pieces at a first stage. Each piece is then stretched to make a bread dough sheet. It is then wound up by a winding up device, thereby a bar-like bread dough piece being shaped. Alternatively, each piece is rotated within a gap between a conveyor and a pressing board or a pressing belt disposed above the conveyor, thereby a bar-like bread dough piece being shaped.

In stretching the bar-like dough piece to elongate it in the axial direction, both its ends tend to be easily elongated as compared with its middle part. Therefore, the rolled bar-like bread dough piece 62 is not uniformly elongated, but has a curvature, as in FIG. 1. This rolled bar-like bread dough piece 62 tends to become a bar-like bread dough piece 64 that has a bent portion, as in FIG. 7.

This results in a manual modification being necessitated, so that a bar-like bread dough piece having a straight shape can be produced. This also leads to complex processes and high production costs.

Also, the rolled bar-like bread dough piece has a residual stress that results from applying an outer force caused by rolling the dough piece. After baking such a dough piece, a bar-like bread dough piece with a curvature or twist on its surface is produced. Therefore, defects have existed in that the bar-like dough piece had a bad appearance or a deformed shape due to the curvature or twist of the dough piece resulting from a residual stress within the dough.

SUMMARY OF THE INVENTION

This invention is intended to resolve the above problems. By one aspect of this invention a method of conveying bar-like bread dough pieces is provided. It comprises causing a bar-like bread dough piece being conveyed on the conveying face of a conveyor, with its axis being perpendicular to the direction of the conveyance thereof, to rotate about said axis, at a point downstream of said conveyor, and then allowing said bar-like bread dough piece to be moved to the next step.

By another aspect of this invention a method of conveying bar-like bread dough pieces is provided. It comprises providing an engaging means near the conveying face of a conveyor that conveys a bar-like bread dough piece, causing said bar-like bread dough piece to rotate about its axis, by a section of said conveying face and said engaging means, at a point downstream of said conveyor, and then allowing said bar-like bread dough piece to be moved to the next step.

By still another aspect of this invention an apparatus for conveying bar-like bread dough pieces is provided. It comprises a conveyor and an engaging member provided near the conveying face of said conveyor, at a point downstream of said conveyor, for allowing a bar-like bread dough piece being conveyed on said conveying face of said conveyor to rotate about its axis, while said engaging member contacts said bar-like bread dough piece, the distance between said engaging member and said conveying face being adjustable.

In this invention, a bar-like bread dough piece having a curvature is rotated at a point downstream of a conveyor, by engaging the bar-like bread dough piece with an engaging means, without subjecting the piece to any outer force resulting from an element such as a pressing board or pressing belt. Therefore, the residual stress within the piece is released, or disappears.

Thus, the piece becomes a bar-like bread dough piece having a straight shape. Namely, a bread dough piece with a twisted bar-like shape returns automatically to one having a straight shape. Therefore, the bar-like bread dough piece producing process is simplified. This leads to low production costs. Also, after baking the bar-like bread dough piece having a straight shape, bar-like bread with no curvature or twist on its surface, but that has a good appearance, is produced.

Further, by this invention a plurality of rows of bar-like bread dough pieces can be mass produced so that bread dough pieces having a bent shape can be modified to form straight bar-like bread dough pieces. Also, by the engaging means, a plurality of rows of bar-like bread dough pieces can be arrayed in regular intervals in the direction that a production line is moving.

BRIEF DESCRIPTION OF THE DRAWINGS

FIG. 9 is a schematic plan view of the fourth embodiment of this invention.

FIG. 10 is a schematic plan view of a fifth embodiment of this invention.

FIG. 11 is a schematic side view of a sixth embodiment of this invention.

PREFERRED EMBODIMENTS OF THE INVENTION

A first embodiment of this invention will now be explained by reference to the attached drawings.

Figure 1:
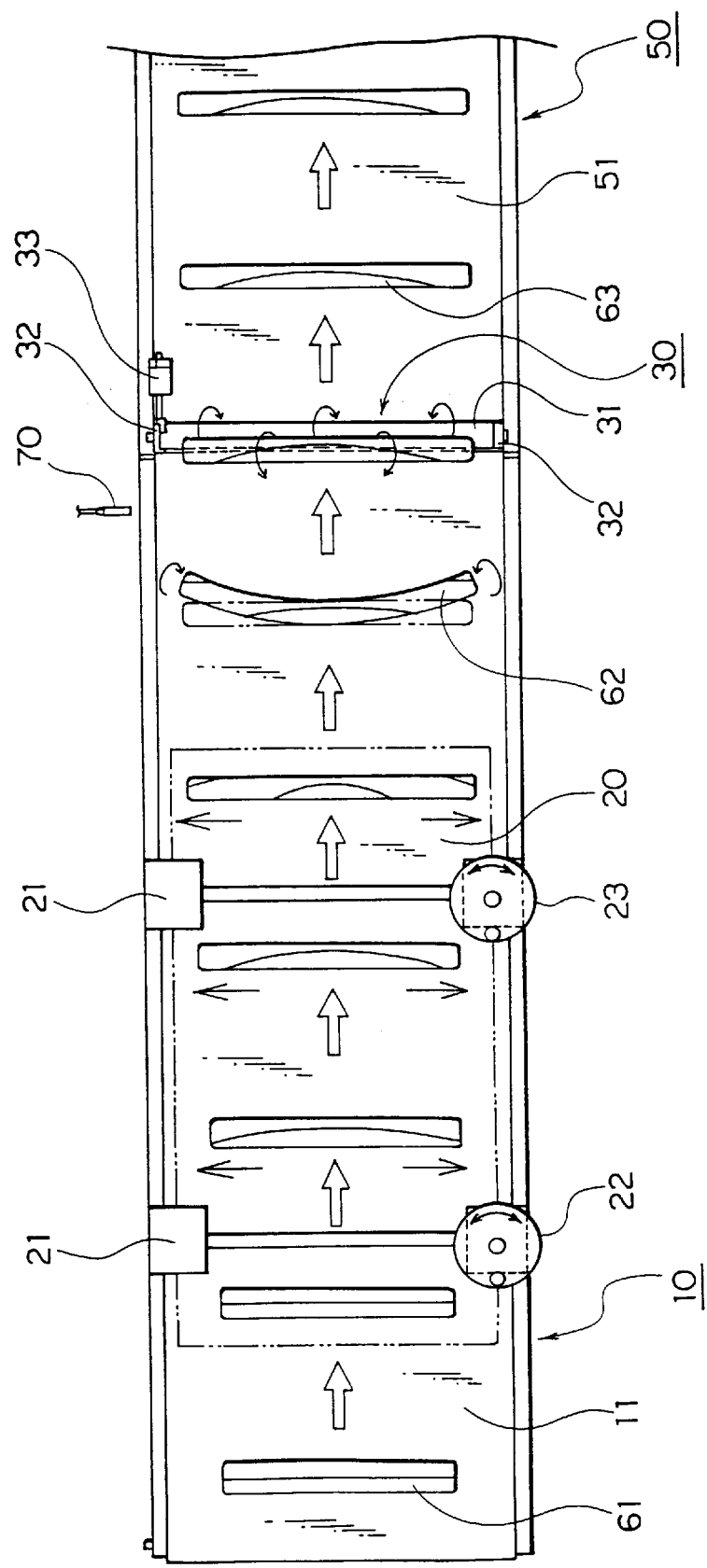
FIG. 1 is a schematic plan view of a first embodiment of this invention.
Figure 2:
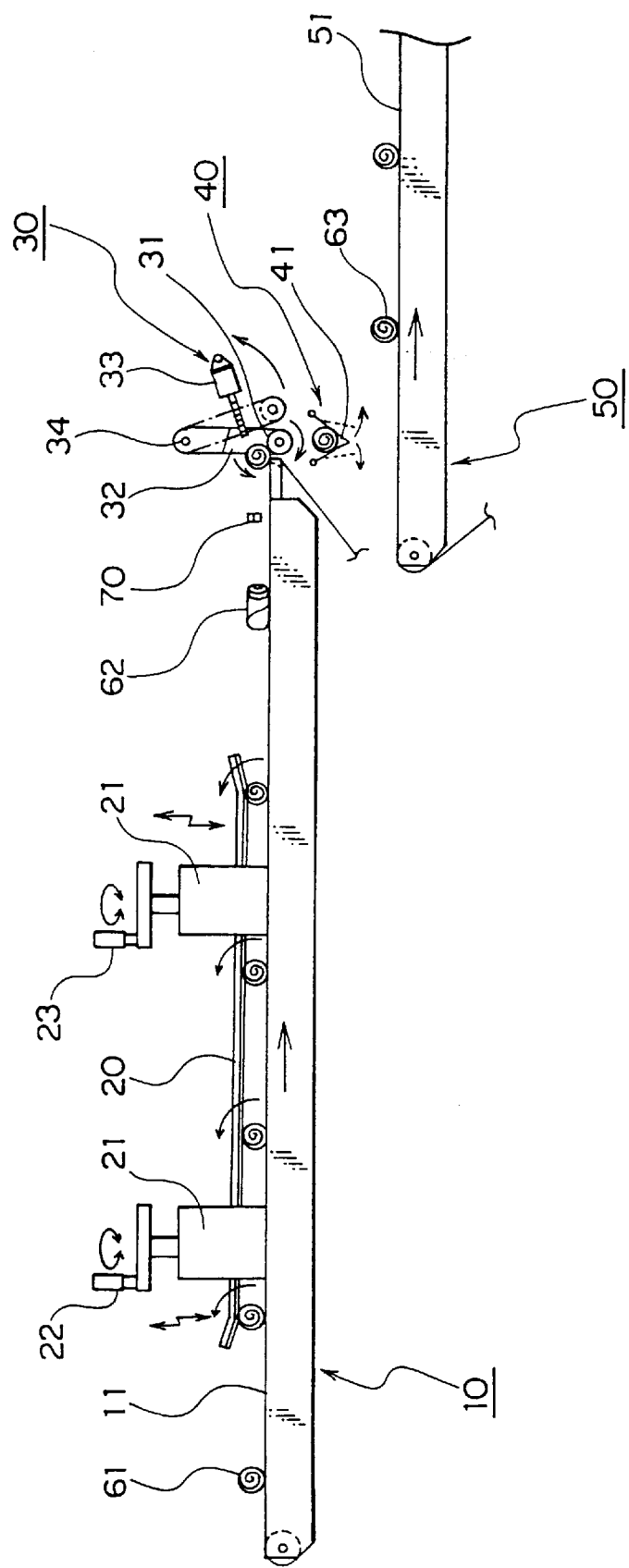
FIG. 2 is a schematic side view of the first embodiment of this invention.
Figure 3:
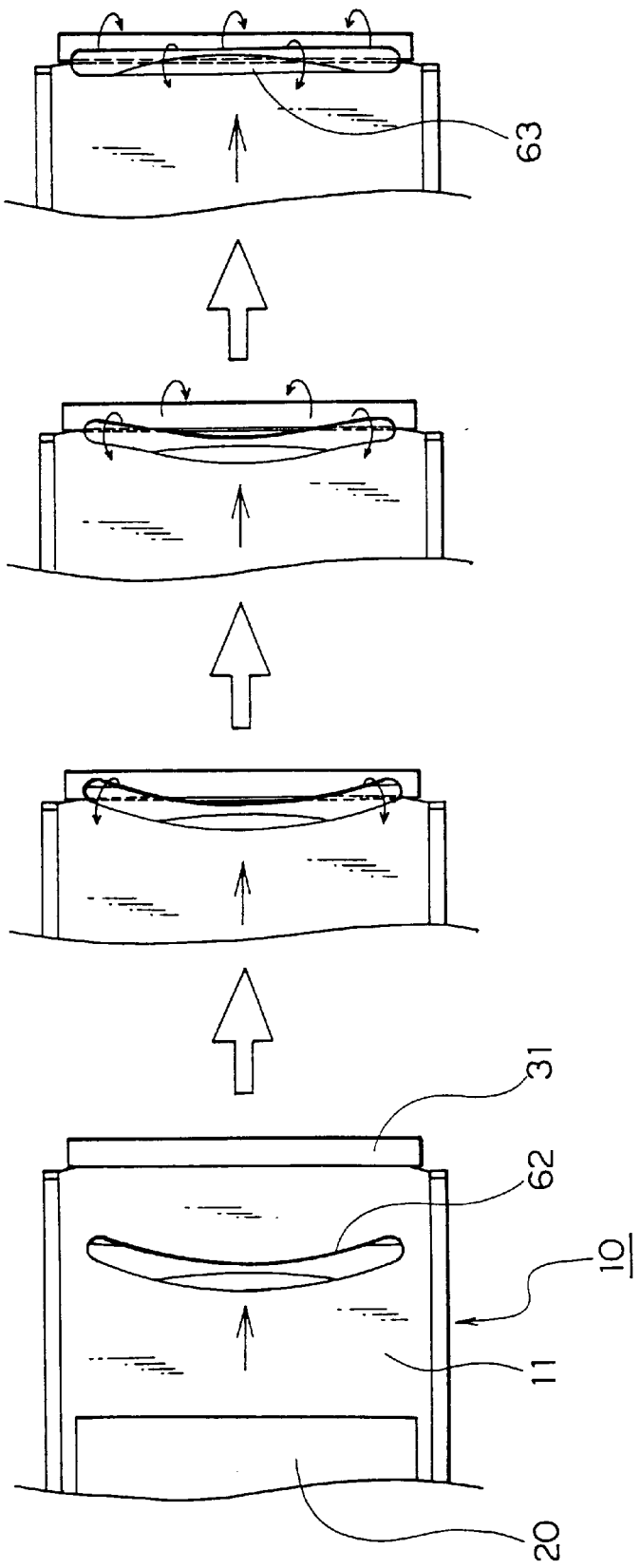
FIGS. 3A, 3B, 3C, and 3D are plan views of the first embodiment to sequentially show situations where a bar-like bread dough piece having a curvature is modified to a bar-shaped bread dough piece having a straight shape.
Figure 4:
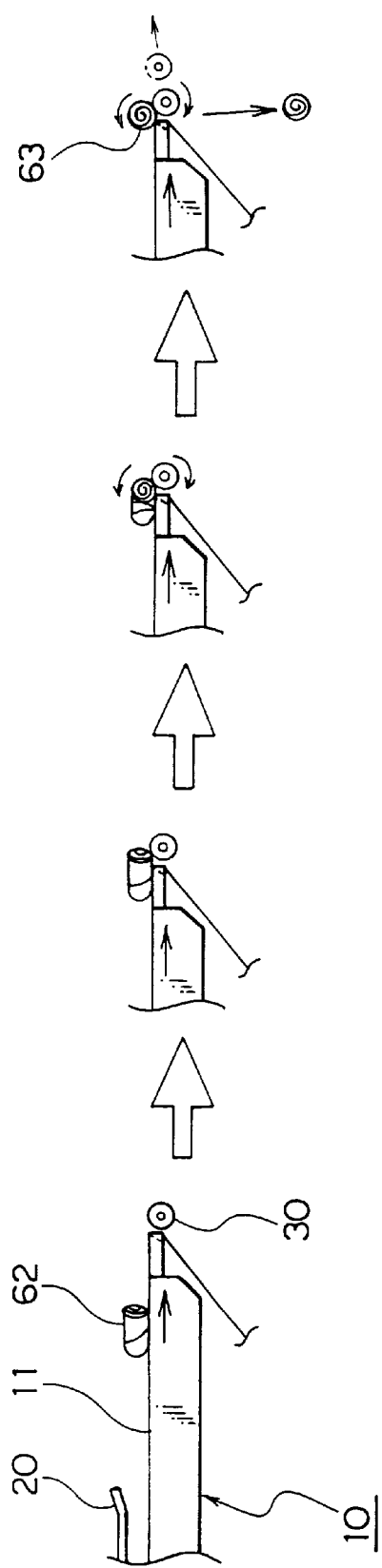
FIGS. 4A, 4B, 4C, and 4D are side views of the first embodiment to sequentially show situations where a bar-like bread dough piece having a curvature is modified to a bar-like bread dough piece having a straight shape.

In FIGS. 1 and 2 a conveyor 10 is disposed, and a conveyor 50 is disposed downstream of and below it. The conveyor 10 is adapted to be driven by means of a motor (not shown). Above the conveyor 10, a pressing board 20 for applying a pressure to a previously shaped bar-like bread dough piece 61 is positioned by means of a frame 21. It has height-adjusting mechanisms 22 and 23. The mechanism 22 is adapted to adjust the height from the conveying face 11 of the conveyor 10 to the inlet portion of the pressing board 20. The mechanism 23 is adapted to adjust the height from the conveying face 11 of the conveyor 10 to the outlet portion of the pressing board 20.

Near the downstream end of the conveyor 10, an engaging member 30 is disposed. It comprises arms 32 for supporting both ends of a freely rotatable roller 31, a shaft 34 for swingably supporting the arms 32, and an air cylinder 33 linked to the arms 32 for swinging them. The member 30 is arranged so that the roller 31 is positioned at a first position near the downstream end of the conveyor 10, and then positioned at a second position away from it. Near the downstream end of the roller 10 a sensor 70 is disposed. It is adapted to detect a bar-like bread dough piece to be rotated by the engaging member 30. Below the roller 31 a receiving means 40 is disposed. It comprises a shutter 41. The receiving means 40 functions to receive a bar-like bread dough piece when the shutter 41 is dosed, and to release the piece when the shutter 41 is opened. Below the receiving means 40 a conveyor 50 is disposed. It is adapted to convey a bar-like bread dough piece to the next step.

A previously wound up bar-like bread dough piece 61 is conveyed on the conveying face 11 of the conveyor 10, and pressed and rolled between the face 11 and the pressing board 20. The piece is elongated to form a desired bar-like bread dough piece 62. The bread dough mass of the middle part of the previously wound up bar-like bread dough piece 61 is confined between the conveying face 11 and pressing board 20. In contrast, the bread dough mass at each end of the piece 62 is not so confined. Therefore, the bread dough mass tends to easily be subject to a rotating force from the conveying face 11 and the pressing board 20. Therefore, both ends of the piece 62 are easily stretched and elongated, as compared with the middle part of the piece 61.

Figure 7:
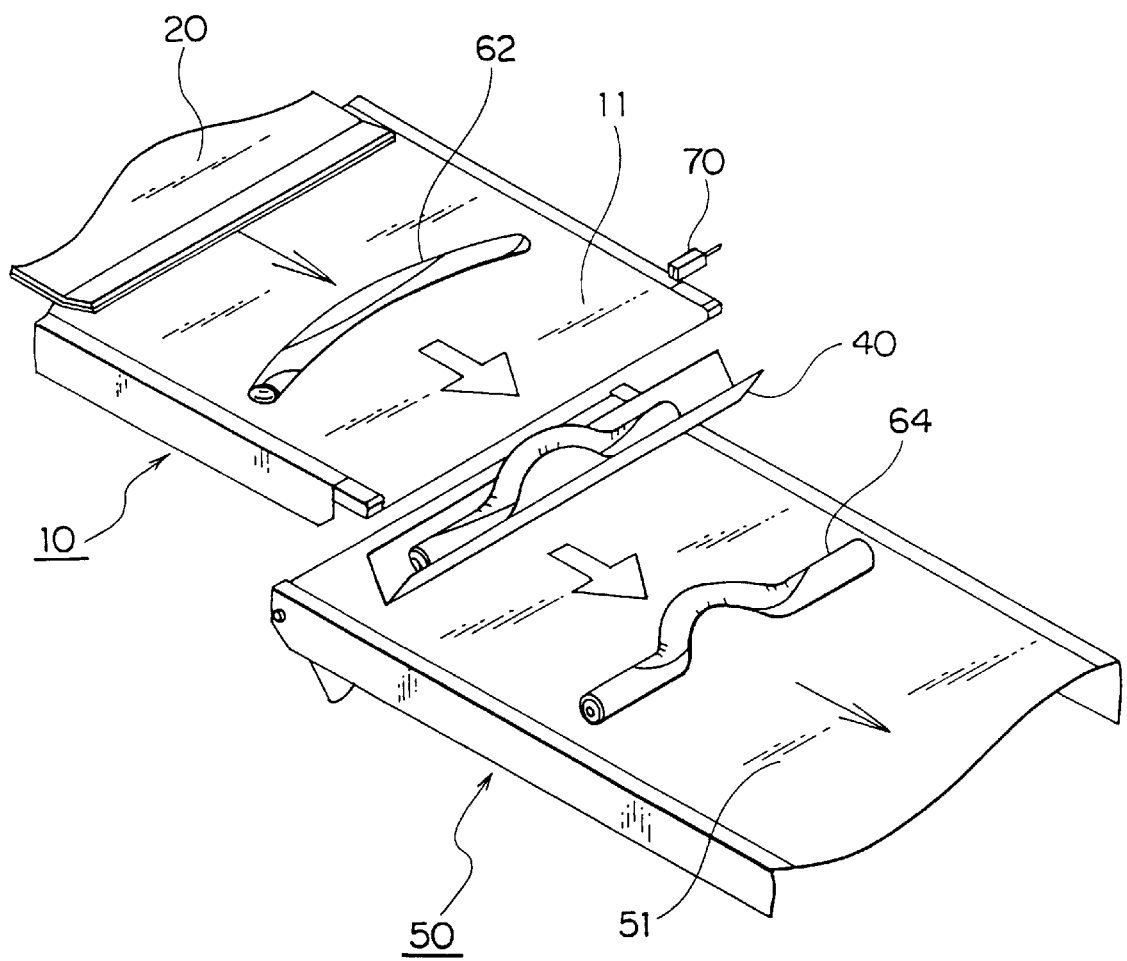
FIG. 7 is a schematic and perspective view to show a bar-like bread dough piece having a bent portion when the engaging member in the first embodiment is removed.

Namely, the degrees of the elongation and the pressing on both ends of the piece 62 differ from those on its middle part. Therefore, the piece 61 be somewhat twisted, and a residual stress occurs within the piece 62. Thus, when the piece 62 is released from the gap between the pressing board 20 and the conveying face 11, both its ends themselves tend to rotate somewhat. As a result, as in FIG. 1, both ends of the piece 62 advance as compared with its middle part. Therefore, the piece 62 has a curvature. If the engaging member 30 is not provided, the piece 62 finally becomes a bar-like bread dough piece 64 that has a bent shape, as in FIG. 7.

The bar-like bread dough piece 62 having a curvature is then fed to the downstream end of the conveyor 10. When the piece 62 is positioned between the downstream end of the belt of the conveyor 10 and the roller 31, the piece 62 is rotated by the friction with the belt when it contacts the roller 31. The roller 31 is freely rotatable. Therefore, it is rotated by the friction with the bar-like bread dough piece 62. Therefore, the piece 62 is rotated while it is supported by the downstream end of the belt of the conveyor 10 and the roller 31.

The rotation of the piece 62 is carried out without subjecting it to any outer force resulting from an element such as a pressing board or a pressing belt.

Therefore, the residual stress within the piece 62 is released, or disappears. Thus, it becomes a bar-like bread dough piece 63 having a straight shape. Namely, the twisted bar-like bread dough piece 62 returns to have a straight shape.

After the piece 62 is modified to form the bar-like bread dough piece 63, a computer (not shown) sends a command to the engaging member 30 to open the gap between the downstream end of the belt and the roller 31, thereby to release the piece 63 downward. Also, a command can be programmed to open the gap when the sensor 70 detects the next bar-like bread dough piece 62. The piece 63 is then received by the receiving means 40, and transferred onto the conveying face 51 of the conveyor 50, by the shutter 41 being opened, to which a command is sent from the computer.

To array a plurality of bar-like bread dough pieces 63 in regular intervals on the conveying face 51, a command can be programmed to adjust the timing for opening the gap and the shutter 41. Situations where the bar-like bread dough piece 62 having a curvature is modified to form the bar-like bread dough piece 63 having a straight shape are sequentially shown in FIGS. 3 and 4. FIGS. 3A, 3B, 3C, and 3D illustrate partial plan views. FIGS. 4A, 4B, 4C, and 4D illustrate partial side views.

The roller 31 can also be rotated by a motor (not shown) in the same direction as that of the rotation of the dough piece 62. Also, the speed at which the roller 31 rotates is preferably adjusted to be the same speed as that of the rotation of the dough piece 62.

A second embodiment of this invention will now be explained by reference to the attached drawing.

Figure 5:
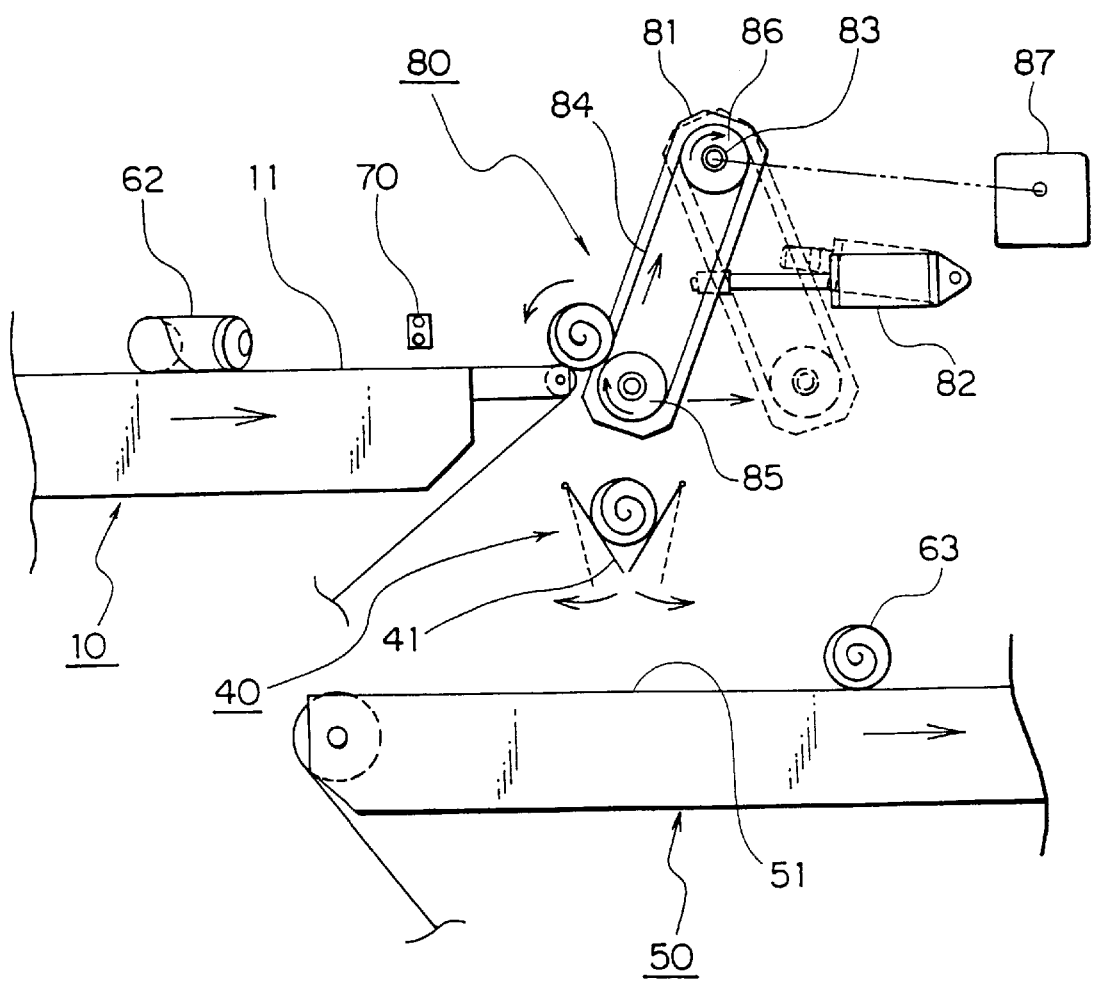
FIG. 5 is a schematic side view of a second embodiment of this invention.

In FIG. 5, in place of the engagement member 30 in the first embodiment, an engaging member 80 is disposed near the downstream end of the belt of the conveyor 10. The member 80 comprises an arm 81, an air cylinder 82, and a motor 87. Rollers 85 and 86 are rotatably mounted on the respective ends of the arm 81. A belt 84 is wound around the rollers 85 and 86. The belt 84 is adapted to move by means of the motor 87 in the direction indicated by an arrow. The arm 81 can swing about a shaft 83 by means of the air cylinder 82, the rod of which is linked to the arm 81.

The bar-like bread dough piece 62 having a curvature is rotated between the downstream end of the belt of the conveyor 10 and the belt 84. The piece 62 is rotated, by the friction with the belt of the conveyor 10 and the belt 84, in the direction indicated by an arrow. The speed that the belt 84 moves is preferably adjusted to be the same as that of the belt of the conveyor 10.

The rotation of the piece 62 is carried out without subjecting it to any outer force. Therefore, the residual stress within the piece 62 is released. Thus, the piece 62 becomes a bar-like bread dough piece 63 having a straight shape. Namely, the shape of the twisted bar-like bread dough piece 62 returns to be straight. The receiving means 40 can be omitted, so that the piece 63 can be transferred directly onto the conveyor 50 or on regularly-arrayed pans for baking bread, placed on the conveyor 50. Since the engaging member 80 uses the belt 84, which has an area wider than that of the roller 31, the piece 62 cannot run beyond the belt 84. The bar-like bread dough piece 63 is then processed in a way similar to that explained regarding the first embodiment.

Figure 6:
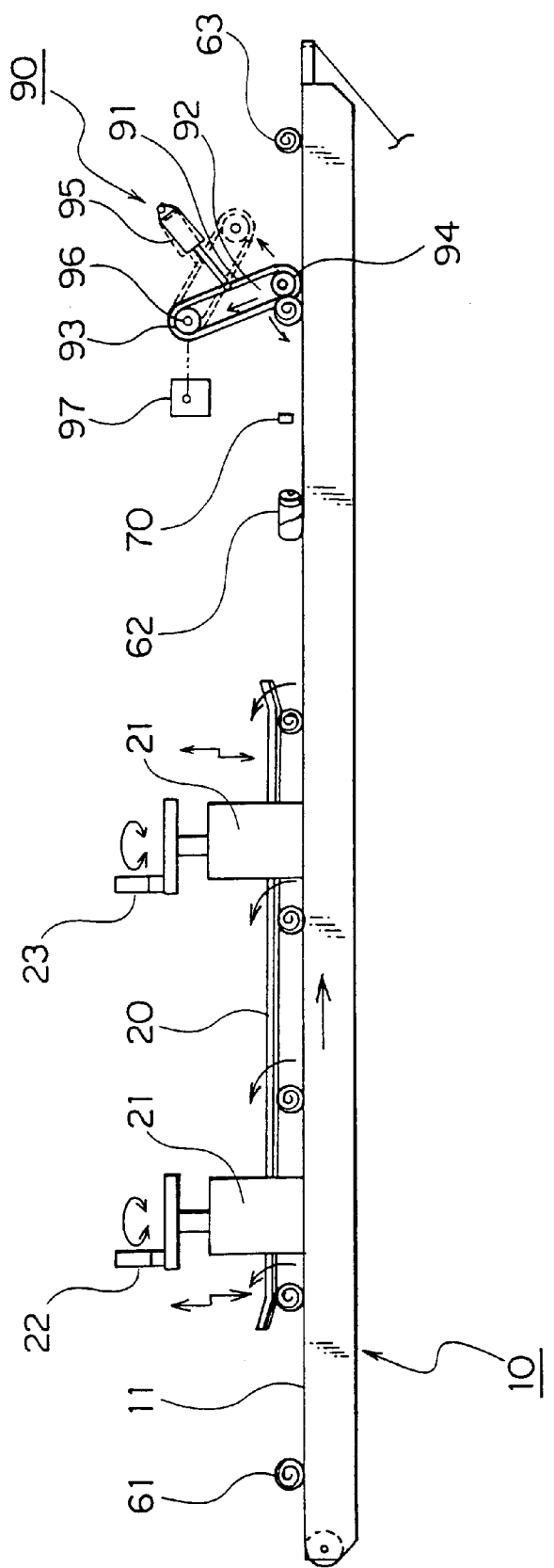
FIG. 6 is a schematic side view of a third embodiment of this invention.

A third embodiment of this invention will now be explained by reference to FIG. 6.

The arrangement of the apparatus of this embodiment is similar to that of the second embodiment. However, the engaging member 90 is disposed above and near the downstream end of the conveyor 10. The member 90 comprises an arm 92, an air cylinder 95, and a motor 97. Rollers 93 and 94 are rotatably mounted on the respective ends of the arm 92.

A belt 91 is wound around the rollers 93 and 94. The belt 91 is adapted to move by means of the motor 97 in the direction indicated by an arrow. The arm 92 can swing about a shaft 96 by means of the air cylinder 95, the rod of which is linked to the arm 91. In this embodiment, the piece 62 is modified in a way similar to that explained regarding the second embodiment. When the modification is completed, the belt 91 is moved away from the piece 62 by a command sent from the computer, as in the second embodiment. Then, the piece 63 is fed to the next step.

Figure 8:
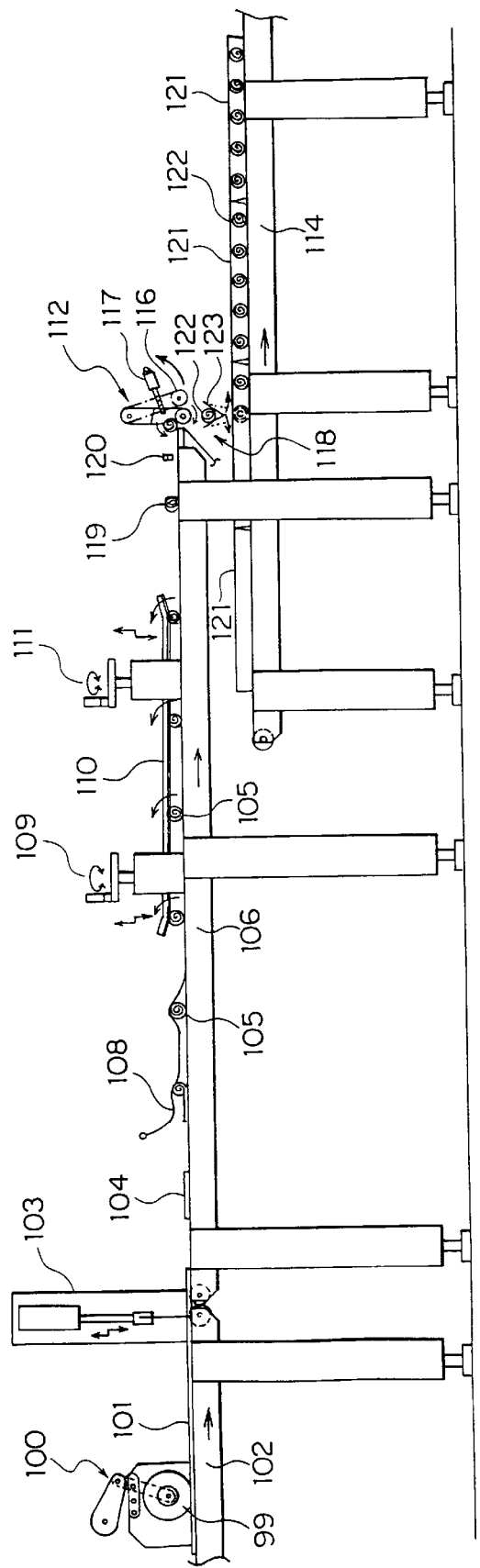
FIG. 8 is a schematic side view of a fourth embodiment of this invention.

A fourth embodiment of this invention will now be explained by reference to FIGS. 8 and 9.

This embodiment aims to treat a plurality of rows of bar-like bread dough pieces. In FIGS. 8 and 9, an apparatus is provided. It comprises a conveyor 102, a cutter 100 that includes four disk cutters 99 for cutting a continuous bread dough sheet 98, a guillotine cutter 103, a conveyor 106 disposed downstream of the conveyor 102, a net 108 disposed above the conveyor 106 for winding up cut bread dough pieces 104, a pressing board 110 disposed above the conveyor 106 for pressing wound up bread dough pieces 105, height-adjusting mechanisms 109 and 111 for adjusting the height from the conveying face of the conveyor 106 to the pressing board 110, an engaging member 112 that includes an air-cylinder 117, a freely rotatable roller 116 for modifying the bent shape of the bread dough pieces 119, a sensor 120 for detecting the bar-like bread dough pieces 119, a receiving means 118 that includes a shutter 123, and a conveyor 114 for conveying pans 121 to the next step.

First, the continuous bread dough sheet 98 is cut by the disk cutters 99 into five narrow bread dough sheets 101. They are laterally cut by the guillotine cutter 103 into five small bread dough sheets 104. They are then wound up by the net 108, thereby forming wound up bread dough pieces 105. They are pressed and rolled within a gap between the pressing board 110 and the conveying face of the conveyor 106 to form desired elongated bread dough pieces 119. As in FIG. 9, they are occasionally not regularly arrayed in their axial directions. Also, each of them has a curvature. When a sensor 120 detects them, a computer (not shown) sends a command to the engaging member 112 so that the roller 116 is moved and positioned near the downstream end of the conveying face of the conveyor 106. When the bread dough pieces 119 arrive at the roller 116, they are rotated between the downstream end of the conveying face of the conveyor 106 and the roller 116. By this rotation, the bread dough pieces 119 that have not been arrayed in their axial directions are modified so that they can be so arrayed, as in FIG. 9. Also, each of them has a straight shape, also as in FIG. 9. When the sensor 120 detects the next group of bar-like bread dough pieces to be modified, the computer sends a command to the engaging member 112 to open the gap between the downstream end of the conveying face of the conveyor 106 and the roller 116. Therefore, bread dough pieces 122 fall onto the receiving means 118. By the command from the computer, the shutter 123 is opened so that the bread dough pieces 122 fall onto the pans 121. Thus, five rows of bar-like bread dough pieces having a straight shape are conveyed by the conveyor 114 to the next step, usually a baking step.

To array the five rows of the bar-like bread dough pieces 122 in regular intervals on the pans 121 in the longitudinal direction of this apparatus, a command can be programmed to adjust the timing for opening the gap between the downstream end of the conveying face of the conveyor 106 and the roller 116, and to adjust the timing for opening the shutter 123.

A fifth embodiment of this invention will now be explained by reference to FIG. 10.

This embodiment aims to process two rows of bar-like bread dough pieces. In FIG. 10, an apparatus is provided. It comprises a conveyor 130, a disk cutter 129 for cutting a continuous bread dough sheet 128, a guillotine cutter 132, a conveyor 136 disposed downstream of the conveyor 130, a net 138 disposed above the conveyor 136 for winding up cut bread dough pieces 140, a pressing board 148 for pressing wound-up bread dough pieces 141, height-adjusting mechanisms 142 and 143 for adjusting the height from the conveying face of the conveyor 136 to the pressing board 148, an engaging member (not shown) that includes an air-cylinder 158 and a freely rotatable roller 155, a sensor 152 for detecting bar-like bread dough pieces 150, a receiving means (not shown), and a conveyor 156 for conveying pans 157 to the next step.

The operation of this embodiment is carried out in a way similar to that explained regarding the fourth embodiment, and the same technical effects as in the fourth embodiment are obtained.

A sixth embodiment of this invention will now be explained by reference to FIG. 11.

In this embodiment, in place of the previously wound up bar-like bread dough piece 61, a previously shaped bar-like bread dough piece 160 that is prepared by rolling a divided and cut bread dough piece is processed, using the apparatus of the first embodiment. The previously shaped bar-like bread dough piece 160 is pressed and rolled and becomes a bread dough piece 162 having a curvature. The curvature of the piece 162 is modified and it becomes a bar-like bread dough piece 163 having a straight shape. In this embodiment, the same technical effects as in the first embodiment are obtained.

As stated above, by this invention a bar-like bread dough piece having a curvature is rotated at a point downstream of the conveyor, by engaging the bar-like bread dough piece with a engaging means, without subjecting the piece to any outer force resulting from an element such as a pressing board or pressing belt. Namely, the bar-like bread dough piece having a curvature is freely rotated. Therefore, the residual stress within the piece is released, or disappears. Thus, the piece becomes a bar-like bread dough piece having a straight shape. Namely, a twisted bar-like bread dough piece returns automatically to have a shape that is straight. Therefore, the bar-like bread-dough piece producing process is simplified. This leads to low production costs. Also, after baking the bar-like bread dough piece having a straight shape, bar-like bread with no curvature or twist on its surface, but with a good appearance, is produced.

Further, by this invention a plurality of rows of bar-like bread dough pieces can be mass produced, so that bread dough pieces having a bent shape can be modified to straight bar-like bread dough pieces. Also, by the engaging means, a plurality of rows of bar-like bread dough pieces can be arrayed in regular intervals in the direction that the production line moves.

What is claimed is:

1. A method of conveying bar-like bread dough pieces comprising the steps of:

conveying a bar-like bread dough piece along a conveying surface of a conveyor having a downstream end, with its axis being perpendicular to a direction of the conveyance thereof, rotating the bar-like bread dough piece both by a rolling surface that is located near the downstream end of the conveyor, and by the conveying surface, about said axis in an inverse direction with respect to the conveying direction of the conveyor to form an elongated bar-like bread, and then feeding the elongated bar-like bread dough piece to another conveyor.

2. The method of claim 1, wherein a plurality of rows of bar-like bread dough pieces are processed.

3. The method of claim 1, wherein said bar-like bread dough piece is one wound up from a bread dough sheet.

4. A method of conveying bar-like bread dough pieces comprising the steps of:

providing an engaging means comprising a rolling surface near a conveying surface of a downstream portion of a conveyor that conveys a bar-like bread dough piece, conveying said bar-like bread dough piece along the conveying surface of the conveyor, with its axis being perpendicular to a direction of the conveyance thereof to said engaging means;

rotating the bar-like bread dough piece both by said rolling surface of the engaging means and by said conveying surface of the conveyor, about said axis in an inverse direction with respect to the conveying direction of the conveyor to form an elongated bar-like bread dough piece; and feeding the elongated bar-like bread dough piece to another conveyor.

5. The method of claim 4, wherein a plurality of rows of bar-like bread dough pieces are processed.

6. The method of claim 4, wherein said bar-like bread dough piece is one wound up from a bread dough sheet.

7. An apparatus for conveying bar-shaped bread dough pieces comprising:

a conveyor for feeding a bar-shaped bread dough piece with its axis being perpendicular to a direction of the conveyance thereof, said conveyor having a conveying surface, and an engaging member having a freely rotatable rolling surface, said engaging member being provided near the conveying surface of said conveyor at a point downstream of said conveyor, said engaging member and said conveying surface of the conveyor coacting to rotate the bar-shaped bread dough piece about said axis in an inverse direction with respect to the conveying direction of the conveyor to form an elongated bar-shaped bread dough piece, the distance between the freely rotatable rolling surface and the conveying surface being adjustable.

8. The apparatus of claim 7, wherein a plurality of engaging members are located in a row near the end of the conveying surface in a direction perpendicular to the conveying direction of the conveyor.

9. The apparatus of claim 7, wherein a means for winding up a bread dough sheet is located to form a bar-like bread dough piece and to supply it to said conveyor.

10. The apparatus of claim 7, wherein said engaging member is a roller that is able to rotate in the same direction as that of the rotation of said bar-like bread dough piece.

11. The apparatus of claim 7, wherein said engaging member is an endless belt that is moved in the same direction as that of the rotation of said bar-like bread dough piece.

12. The apparatus of claim 7, wherein said apparatus further includes a sensor for detecting said bar-like bread dough piece.

13. The apparatus of claim 7, wherein said apparatus further includes another conveyor for receiving said bar-like bread dough piece from the engaging member.

14. The method of claim 1 wherein the bar-like bread dough piece is wound up and pressed prior to rotating it by the rolling surface and conveying surface.

15. The method of claim 4 wherein the bar-like bread dough piece is wound up and pressed prior to rotating it by the rolling surface and conveying surface.

16. The apparatus of claim 7 wherein said conveyor has a downstream portion and wherein said engaging member is located near said downstream portion.

17. The apparatus of claim 16 wherein said conveyor comprises an upstream portion, wherein said upstream portion includes a dough pressing device.

\* \* \* \* \*